(12) United States Patent
Folkers et al.

(10) Patent No.: US 11,248,797 B2
(45) Date of Patent: Feb. 15, 2022

(54) AXIAL STOP CONFIGURATION FOR A COMBUSTION LINER

(71) Applicant: Chromalloy Gas Turbine LLC, Palm Beach Gardens, FL (US)

(72) Inventors: Daniel L. Folkers, Stuart, FL (US); Zhenhua Xiao, West Palm Beach, FL (US); Vincent C. Martling, Wellington, FL (US); Adam L. Hart, Stuart, FL (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 365 days.

(21) Appl. No.: 16/178,682

(22) Filed: Nov. 2, 2018

(65) Prior Publication Data

US 2020/0141585 A1    May 7, 2020

(51) Int. Cl.
*F23R 3/60* (2006.01)
*F23R 3/00* (2006.01)

(52) U.S. Cl.
CPC ............... *F23R 3/60* (2013.01); *F23R 3/002* (2013.01)

(58) Field of Classification Search
CPC .. F23R 3/002; F23R 3/60; F23R 2900/00017; F01D 9/023
See application file for complete search history.

(56) References Cited

U.S. PATENT DOCUMENTS

| | | | |
|---|---|---|---|
| 5,749,218 A * | 5/1998 | Cromer | F02K 1/805 |
| | | | 60/796 |
| 6,216,442 B1 * | 4/2001 | Belsom | F02C 7/20 |
| | | | 60/797 |
| 6,279,313 B1 * | 8/2001 | Lawen, Jr. | F23R 3/46 |
| | | | 60/752 |
| 6,430,932 B1 | 8/2002 | Martling et al. | |
| 7,082,766 B1 * | 8/2006 | Widener | F23R 3/46 |
| | | | 60/752 |
| 8,118,549 B2 | 2/2012 | Schiavo | |
| 8,418,474 B2 | 4/2013 | Rizkalla et al. | |
| 8,434,313 B2 | 5/2013 | Tschuor et al. | |
| 8,955,331 B2 | 2/2015 | Moehrle et al. | |
| 9,435,535 B2 * | 9/2016 | Desai | F23R 3/002 |

(Continued)

FOREIGN PATENT DOCUMENTS

EP    3450851 A1    3/2019

OTHER PUBLICATIONS

PCT Application No. PCT/US19/59383, International Search Report and Written Opinion, dated Jan. 24, 2020, 9 pages.

(Continued)

*Primary Examiner* — William H Rodriguez
(74) *Attorney, Agent, or Firm* — Avek IP (57) ABSTRACT

An apparatus and method for mounting a combustion liner within a flow sleeve of a gas turbine combustion system is disclosed. A mounting system comprises a plurality of low-profile mounting tabs secured to a combustion liner where each of the mounting tabs are placed within slots of flow sleeve pegs when the combustion liner is installed in a flow sleeve. A plurality of liner stop brackets are removably secured to a flange of the flow sleeve and have an arm extending to be adjacent to a top contact surface of the mounting tabs. The mounting system reduces blockage to the surrounding airflow.

15 Claims, 10 Drawing Sheets

(56) References Cited

U.S. PATENT DOCUMENTS

| | | | |
|---|---|---|---|
| 2002/0184892 A1* | 12/2002 | Calvez | F23R 3/60 60/796 |
| 2003/0106317 A1 | 6/2003 | Jorgensen et al. | |
| 2004/0118127 A1* | 6/2004 | Mitchell | F23R 3/007 60/796 |
| 2004/0154303 A1* | 8/2004 | Mitchell | F23R 3/60 60/772 |
| 2004/0261419 A1* | 12/2004 | McCaffrey | F23M 5/04 60/796 |
| 2006/0271311 A1* | 11/2006 | Gao | G06Q 10/00 702/34 |
| 2007/0119182 A1* | 5/2007 | Czachor | F02C 3/14 60/796 |
| 2007/0130958 A1* | 6/2007 | Ohri | F23R 3/60 60/796 |
| 2009/0101788 A1* | 4/2009 | Kidder | F23R 3/60 248/674 |
| 2009/0139238 A1 | 6/2009 | Martling et al. | |
| 2011/0089266 A1 | 4/2011 | Stoia et al. | |
| 2011/0247193 A1* | 10/2011 | Herbold | F23R 3/002 29/464 |
| 2011/0314829 A1* | 12/2011 | Kuppusamy | F01D 9/023 60/752 |
| 2012/0036857 A1* | 2/2012 | Bassani | F23R 3/60 60/752 |
| 2012/0047909 A1* | 3/2012 | Ghanime | F23R 3/60 60/796 |
| 2013/0086921 A1 | 4/2013 | Matthews et al. | |
| 2014/0026581 A1* | 1/2014 | Clifford | F23J 13/00 60/752 |
| 2014/0041391 A1 | 2/2014 | DiCintio et al. | |
| 2015/0107267 A1 | 4/2015 | Cotton et al. | |
| 2015/0128609 A1* | 5/2015 | Piersall | F01D 25/04 60/796 |
| 2015/0184856 A1* | 7/2015 | Stuttaford | B23K 31/02 60/796 |
| 2018/0038594 A1 | 2/2018 | Shibata | |
| 2018/0080650 A1* | 3/2018 | Pucci | F23R 3/002 |

OTHER PUBLICATIONS

Non-Final Office Action, dated May 10, 2021, 15 pages, issued in U.S. Appl. No. 16/178,768.

Final Office Action, dated Feb. 2, 2021, 15 pages, issued in U.S. Appl. No. 16/178,768.

\* cited by examiner

AXIAL STOP CONFIGURATION FOR A COMBUSTION LINER

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to a method and apparatus for locating and supporting a combustion liner in a desired position within a gas turbine combustor. More specifically, embodiments of the present disclosure relate to a liner stop bracket configured to reduce combustor vibrations and blockage of compressed air to the combustion system.

BACKGROUND OF THE DISCLOSURE

A gas turbine engine typically comprises a multi-stage compressor coupled to a multi-stage turbine via an axial shaft. Air enters the gas turbine engine through the compressor where its temperature and pressure are increased as it passes through subsequent stages of the compressor. The compressed air is then directed to one or more combustors where it is mixed with a fuel source to create a combustible mixture. This mixture is ignited in the combustors to create a flow of hot combustion gases. These gases are directed into the turbine causing the turbine to rotate, thereby driving the compressor. The output of the gas turbine engine can be mechanical thrust via exhaust from the turbine or shaft power from the rotation of an axial shaft, where the axial shaft can drive a generator to produce electricity.

In a typical industrial gas turbine engine, the combustor section comprises a plurality of can-annular combustors. A representative combustor section 100 is depicted in FIGS. 1-5. In this configuration a combustor case 102 encompasses a flow sleeve 104, which is designed to help direct cooling air along an outer surface of a combustion liner 106, which is contained within the flow sleeve 104. In this configuration, the combustor case 102, flow sleeve 104, and combustion liner 106 are each generally cylindrical in shape, where the flow sleeve 104 slides in the combustor case 102 and the combustion liner 106 slides in the flow sleeve 104. The combustion liner 106 is held axially and radially in the desired location by a flow sleeve peg 108 receiving a liner tab 110, where the liner tab 110 takes the load of the combustion liner 106.

Figure 1:
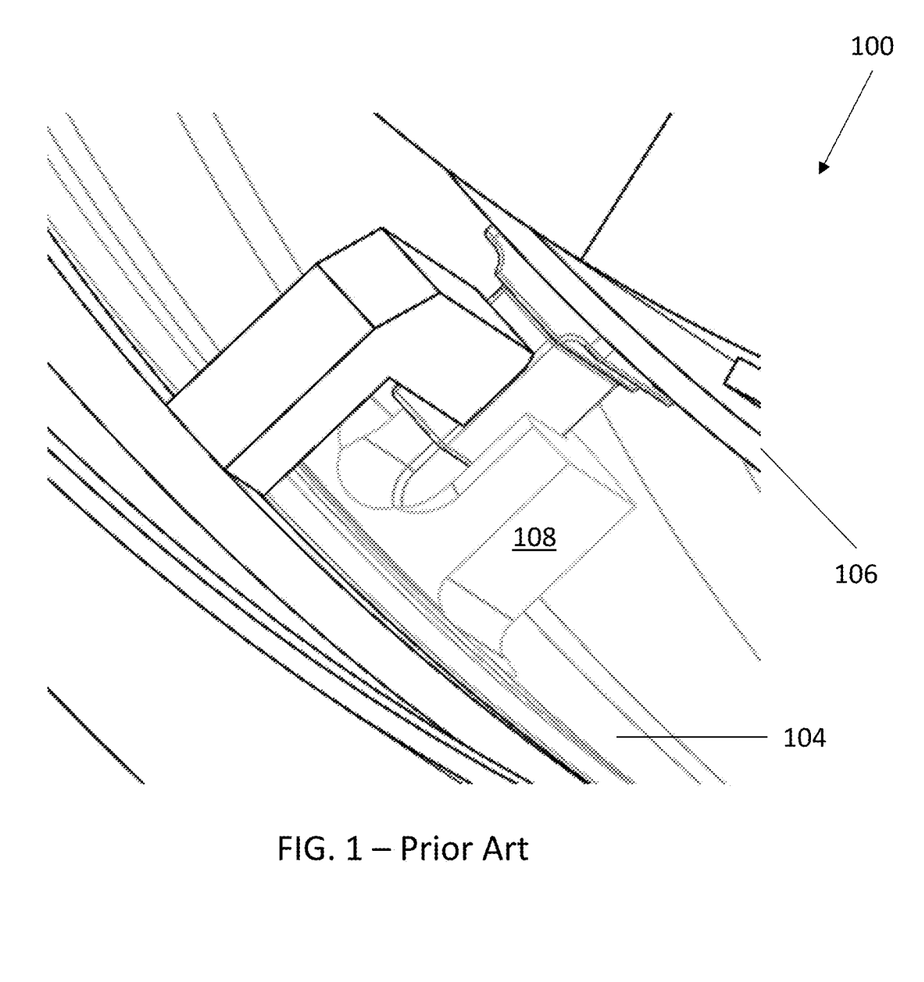
FIG. 1 is a perspective view of a portion of a gas turbine combustor in accordance with the prior art.
Figure 2:
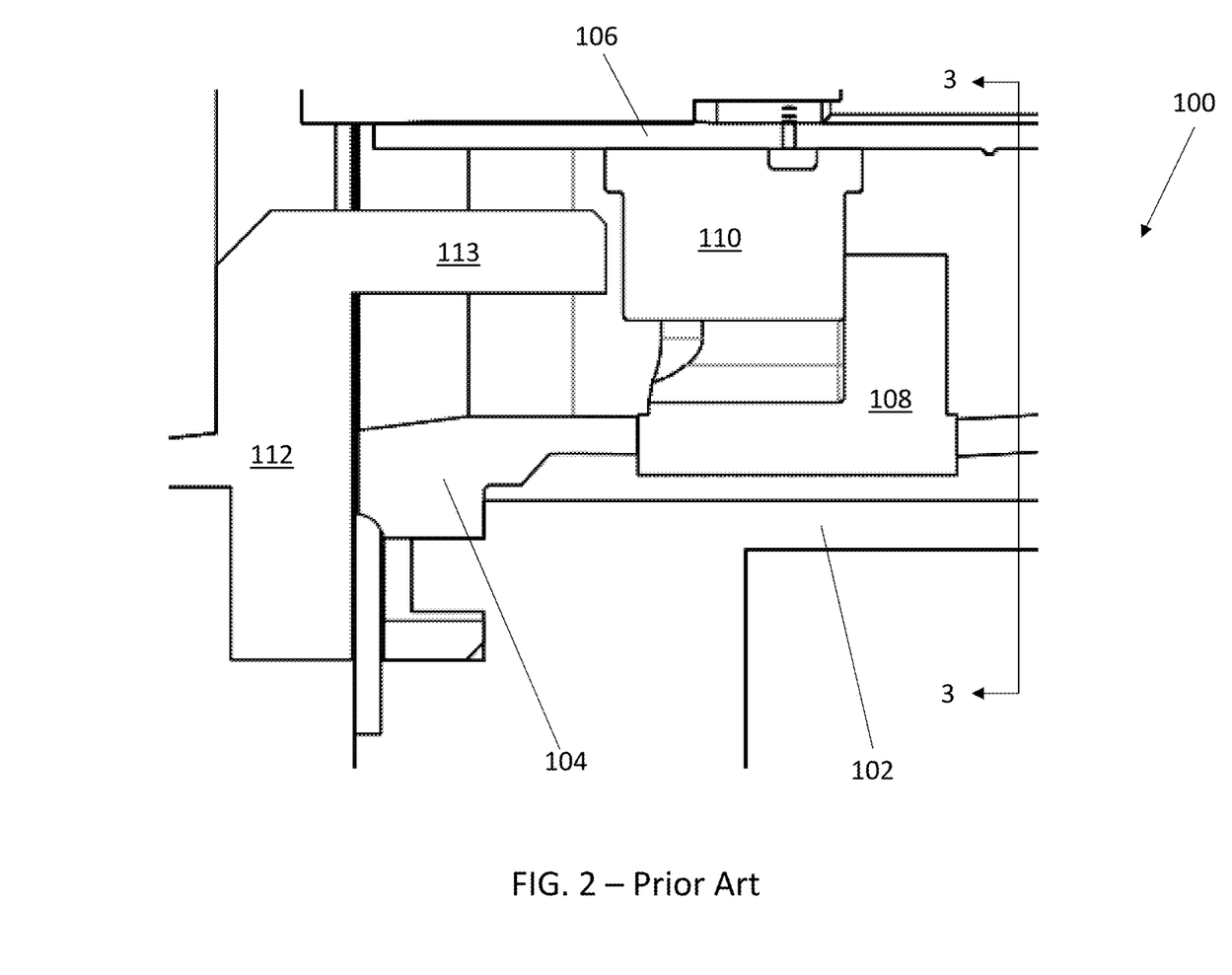
FIG. 2 is a cross section view of the portion of the gas turbine combustor of FIG. 1 in accordance with the prior art.

A combustor cap 112 is then secured over the combustion liner 106 and flow sleeve 104. The combustor cap 112 also includes an axially-extending portion 113 extending towards the combustion liner tab 110. However, the axially-extending portion 113 does not contact the combustion liner tab 110. As such, the combustion liner 106 is capable of slight axial movements relative to the flow sleeve 104 causing wear and unwanted vibratory motion between the combustion liner 106, flow sleeve 104, and combustor cap 112.

Figure 3:
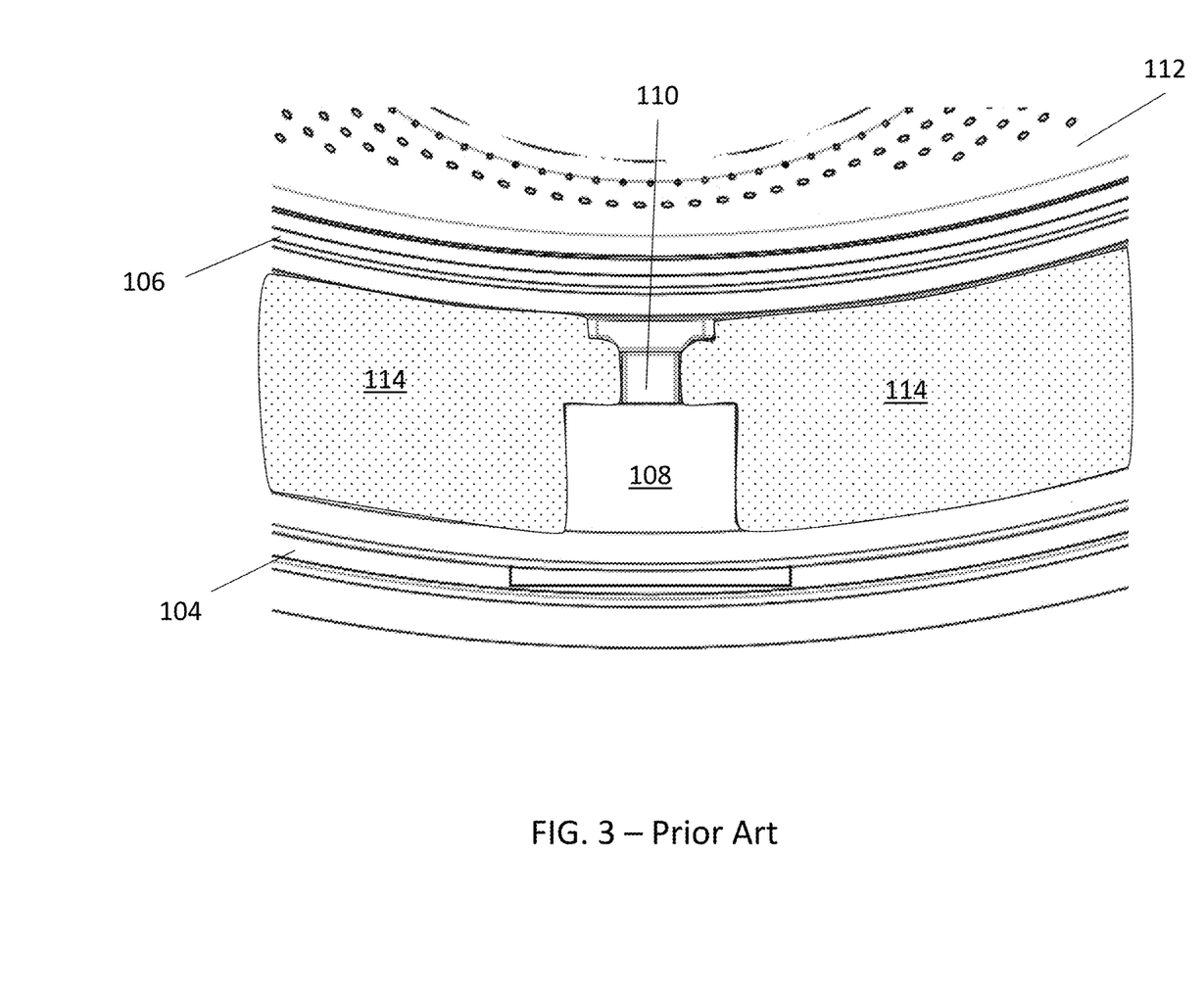
FIG. 3 is an alternate cross section view of the portion of the gas turbine combustor of FIG. 2 in accordance with the prior art.
Figure 4:
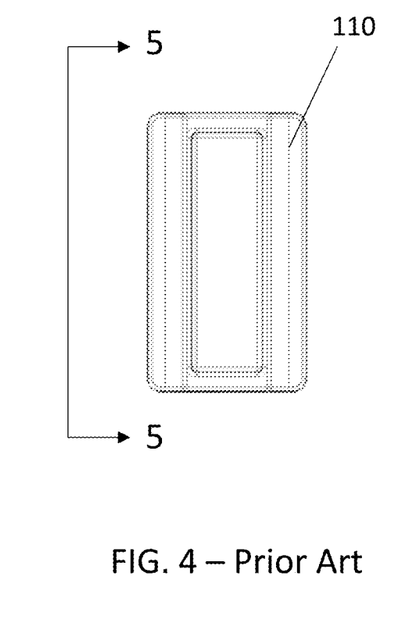
FIG. 4 is an elevation view of a mounting tab for a combustion liner in accordance with the prior art.
Figure 5:
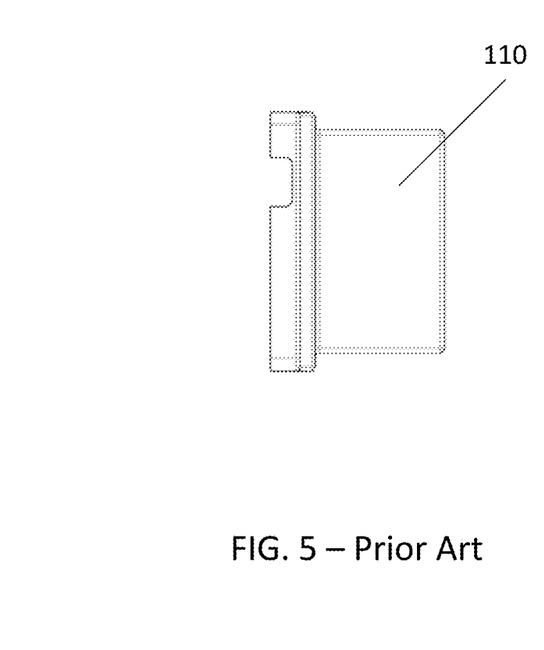
FIG. 5 is an alternate elevation view of a mounting tab for a combustion liner in accordance with the prior art.

Referring now to FIG. 3 which depicts a view looking forward towards the combustor cap 112, the combustion liner tab 110 is located within a flow sleeve peg 108 and forms a passage 114 between the combustion liner 106 and flow sleeve 104. Due to the geometry of the flow sleeve peg 108 and combustion liner tab 110, the flow sleeve peg 108 blocks a portion of the passage 114, thus restricting the flow of compressed air to combustor cap 112.

BRIEF SUMMARY OF THE DISCLOSURE

The present disclosure provides a method and apparatus for improving the assembly of a combustion liner within a flow sleeve of a gas turbine combustion system.

In an embodiment of the present disclosure, a mounting system for a gas turbine combustion system is disclosed. The mounting system comprises a plurality of mounting tabs secured to a combustion liner where each of the mounting tabs have a top contact surface with a first width and a bottom contact surface with a second width. A plurality of pegs is secured to a flow sleeve, where each peg has a slot configured to receive one of the plurality of mounting tabs of a combustion liner. A plurality of liner stop brackets are secured to a flange of the flow sleeve and have an arm in contact with the top contact surface of the mounting tabs. The liner stop bracket has a bracket width comparable to the first width of the mounting tabs, thus reducing any blockage to the surrounding airflow.

In an alternate embodiment of the present disclosure, a liner stop bracket for retaining a combustion liner within a flow sleeve of a gas turbine engine is disclosed. The liner stop bracket comprises a mounting flange having a flange height, an arm extending away from the mounting flange, and a bracket body extending from a curved portion to a bottom contact surface. The liner stop bracket has a bracket width and a bracket slot.

In another embodiment of the present disclosure, a method of securing a combustion liner in a flow sleeve of a gas turbine combustor is disclosed. A flow sleeve is provided where the flow sleeve has a plurality of flow sleeve pegs, with each flow sleeve peg having a slot. A combustion liner having a corresponding number of mounting tabs is also provided. The combustion liner is inserted into the flow sleeve such that the plurality of mounting tabs is located within the slots of the plurality of flow sleeve pegs. Then, a liner stop bracket is positioned on a flange of the flow sleeve such that a bottom contact surface of the liner stop bracket is immediately adjacent a top contact surface of the mounting tab and the liner stop bracket is secured to the flow sleeve.

The present disclosure is aimed at extending the life of the interface region between a combustion liner and flow sleeve, thereby reducing engine operating costs. Furthermore, the present disclosure seeks to reduce airflow disturbances at a forward end of a combustor thereby reducing combustion dynamics and emissions while also improving the structural integrity of a combustion liner retention mechanism.

These and other features of the present disclosure can be best understood from the following description and claims.

BRIEF DESCRIPTION OF THE SEVERAL VIEWS OF THE DRAWINGS

The present disclosure is described in detail below with reference to the attached drawing figures, wherein.

DETAILED DESCRIPTION

The present disclosure is intended for use in a gas turbine engine, such as a gas turbine used for aircraft engines and/or power generation. As such, the present disclosure is capable of being used in a variety of turbine operating environments, regardless of the manufacturer.

As those skilled in the art will readily appreciate, a gas turbine engine is circumferentially disposed about an engine centerline, or axial centerline axis. The engine includes a compressor, a combustion section and a turbine with the turbine coupled to the compressor via an engine shaft. As is well known in the art, air compressed in the compressor is mixed with fuel, which is burned in the combustion section and expanded in turbine. The combustion system is connected to the turbine by a transition duct, where the transition duct changes in radial and circumferential profile along its axial length to transition from a combustion system to a turbine inlet.

Figure 6:
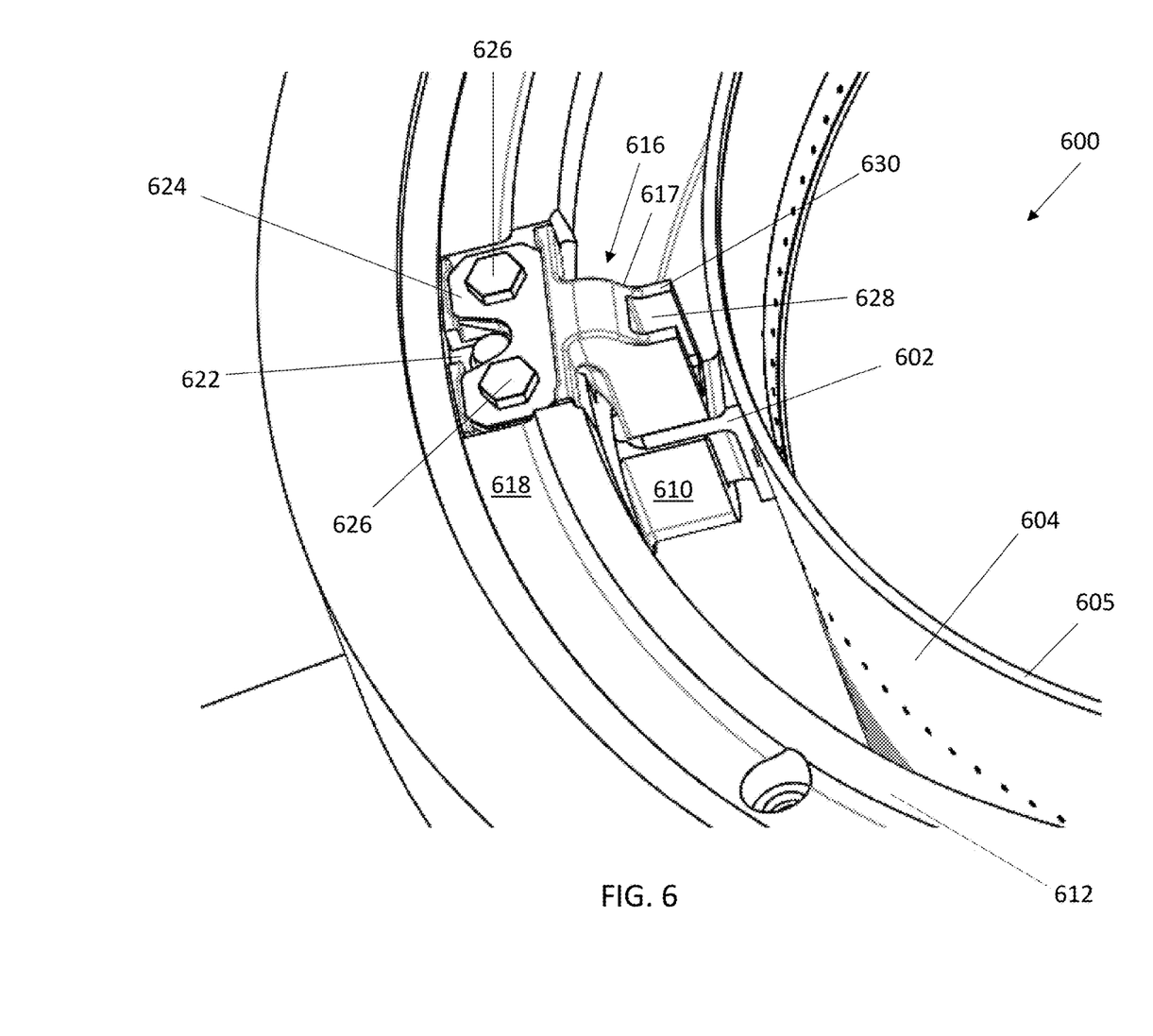
FIG. 6 is a perspective view of a portion of a gas turbine combustor in accordance with an embodiment of the present disclosure.

Embodiments of the present disclosure are depicted in FIGS. 6-12. Referring initially to FIG. 6, a mounting system 600 for a gas turbine combustion system is depicted. The mounting system 600 comprises a plurality of mounting tabs 602 secured to a combustion liner 604 proximate an inlet end 605. The mounting tabs 602 have a top contact surface 606 with a first width W1 and a bottom contact surface 608 having a second width W2, where the first width W1 is greater than the second width W2. The system 600 also comprises a plurality of pegs 610 secured to a flow sleeve 612, where the plurality of pegs 610 each have a slot 614 configured to receive one of the plurality of mounting tabs 602.

The mounting system 600 also comprises a plurality of liner stop brackets 616, where the brackets 616 are secured to a flange 618 of the flow sleeve 612. To further reduce any disturbance or impact to the airflow passing through a passage 620, the flange 618 includes a recessed portion 622 in which a first portion of the liner stop bracket 616 is received and secured to the flow sleeve 612.

Figure 7:
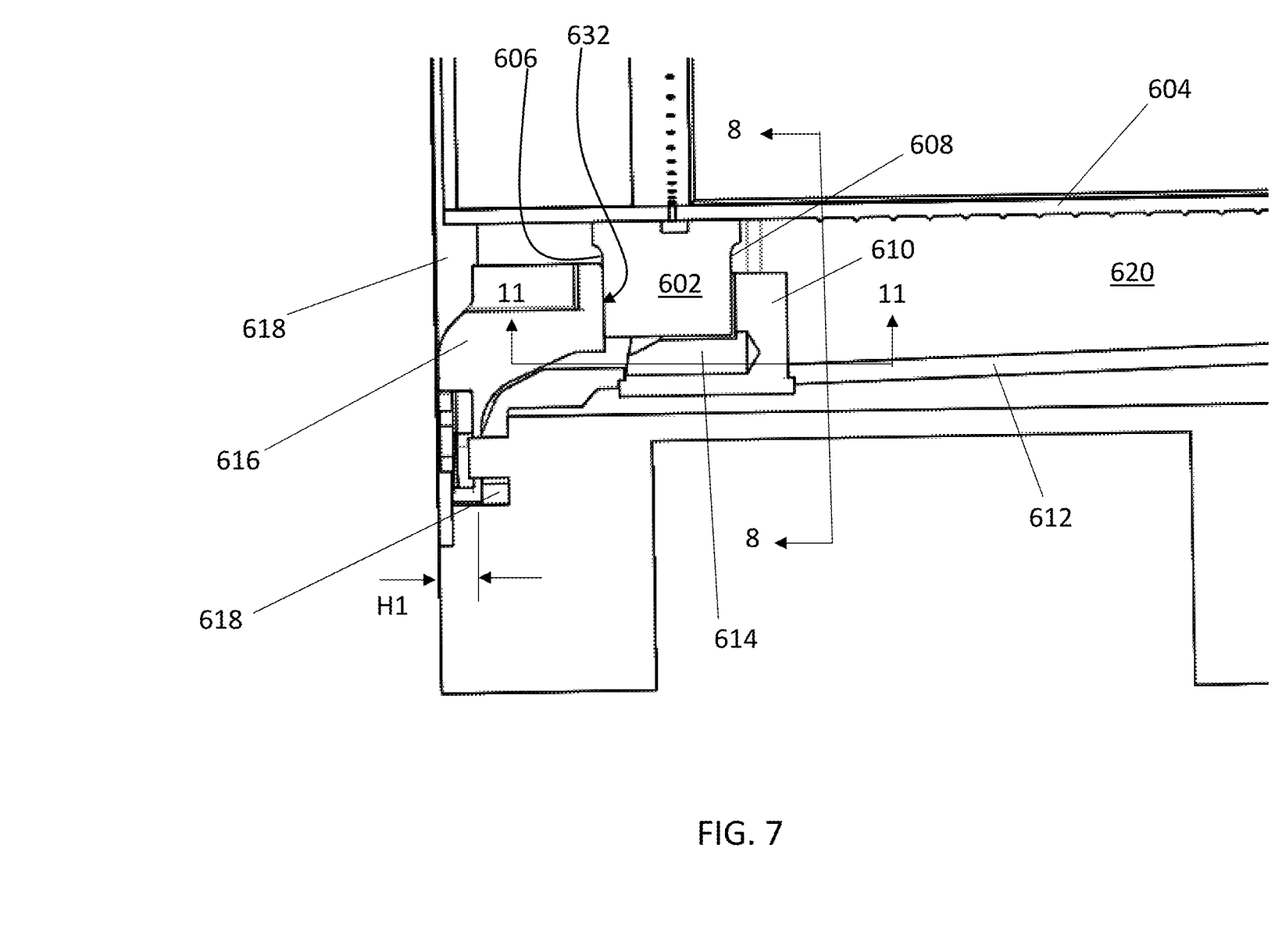
FIG. 7 is a cross section view of the portion of the gas turbine combustor of FIG. 6 in accordance with an embodiment of the present disclosure.
Figure 8:
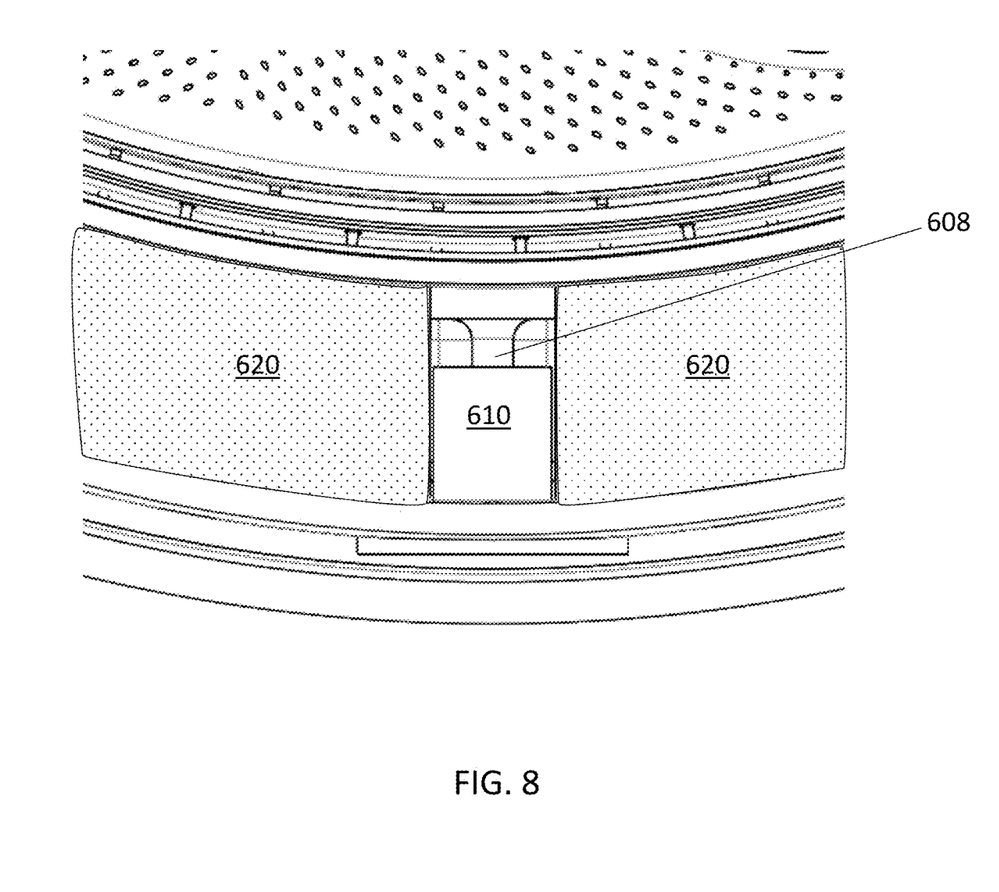
FIG. 8 is an alternate cross section view of the portion of the gas turbine combustor of FIG. 6 in accordance with an embodiment of the present disclosure.
Figure 9:
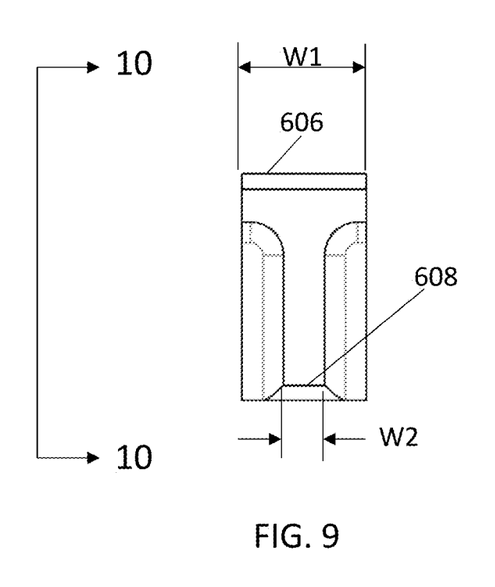
FIG. 9 is an elevation view of a mounting tab for a combustion liner in accordance with an embodiment of the present disclosure.
Figure 10:
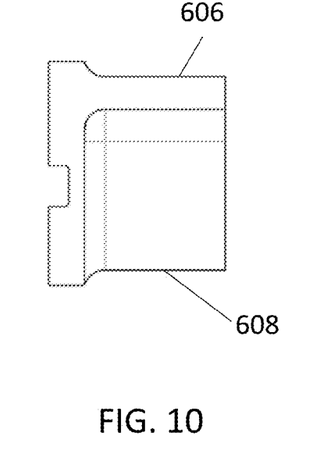
FIG. 10 is an alternate elevation view of a mounting tab for a combustion liner in accordance with an embodiment of the present disclosure.
Figure 11:
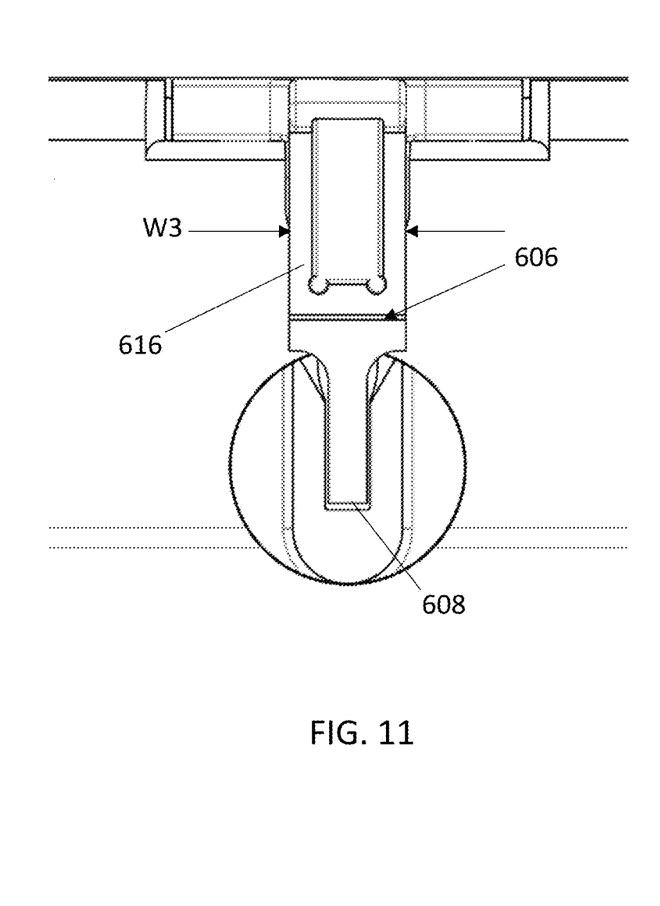
FIG. 11 is an alternate cross section view of the portion of the gas turbine combustor of FIG. 6 in accordance with an embodiment of the present disclosure.

The liner stop brackets 616 have an arm 617 extending in a direction, such that when installed as shown in FIGS. 6-7, the liner stop brackets 616 are immediately adjacent to, or in contact with, the top contact surface 606 of the mounting tabs 602. Each liner stop bracket 616 also includes a bracket width W3, as shown in FIG. 11, where the bracket width W3 is comparable to the first width W1 of the mounting tabs. Given the alternate mounting tab configuration and liner stop bracket, the present disclosure increases an interface contact area by approximately four times compared to the prior art embodiment.

Since the liner stop brackets 616 hold the mounting tabs 602 in the pegs 610, it is necessary for the liner stop brackets 616 to be removable from the flow sleeve 612. Therefore, the liner stop brackets 616 are removably secured to the flow sleeve flange 618 by a plurality of fasteners 626, which can be bolts, extending through one or more corresponding holes in the flow sleeve flange 618.

The mounting tabs 602 have a reduced profile (W2) compared to combustion liner tabs 110 of the prior art. As can be seen from FIG. 8, the mounting tab 602 when placed in the peg 610 also has a reduced profile when compared to the prior art (see FIG. 3), thus reducing blockage of air flow passing through the passage 620.

The specific geometry and configuration of the combustion liner 604 and flow sleeve 612 can vary depending on overall engine design, performance requirements, and other combustor hardware configurations. The present disclosure incorporates a plurality of pegs 610, a plurality of mounting tabs 602, and a plurality of liner stop brackets 616. For the present disclosure, three equally spaced pegs, mounting tabs, and liner stop brackets are utilized. However, it is possible that more than three mounting points can be utilized.

In an embodiment of the present disclosure, the liner stop bracket 616 can further comprise a bracket slot 628 in the arm 617. The bracket slot 628 may be necessary for receiving other parts of a combustion system depending on the specific combustor configuration.

In an alternate embodiment of the present disclosure, a liner stop bracket 616 for retaining a combustion liner 604 within a flow sleeve 612 is provided. The liner stop bracket 616 includes a first portion, or mounting flange, 624 having a flange height H1 and an arm 617 extending away from the mounting flange 624 and has a curved portion, which can be seen in FIGS. 6 and 7. A bracket body 630 extends from the curved portion of the arm 617 to a bottom contact surface 632.

The liner stop bracket 616 can be fabricated from a variety of materials but is preferably similar to the flow sleeve 612. The liner stop bracket 616 can be machined from a block of material or can be a cast component or a combination of casting and machining.

As discussed above, and shown in FIG. 7, the liner stop bracket 616 is immediately adjacent the mounting tab 602 in order to help limit any movement of the combustion liner 604 relative to the flow sleeve 612. More specifically, the bottom contact surface 632 of the liner stop bracket 616 is immediately adjacent a top contact surface 606 of the mounting tab 602.

Figure 12:
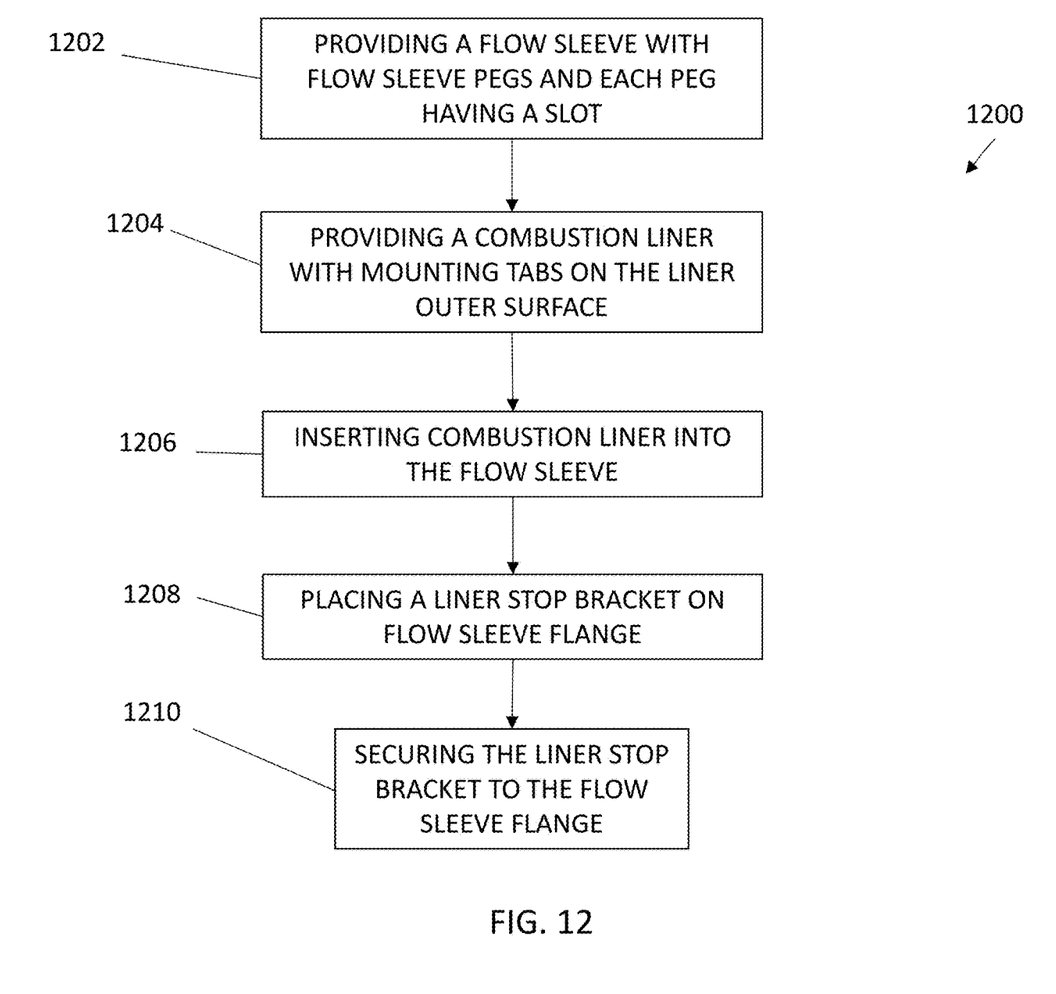
FIG. 12 is a diagram identifying a method of securing a combustion liner in a gas turbine combustor.

In another embodiment of the present disclosure, a method 1200 of securing a combustion liner in a flow sleeve of a gas turbine combustor is provided. This alternate embodiment of the present disclosure is depicted in FIG. 12. In a step 1202, a flow sleeve is provided having a plurality of flow sleeve pegs, with each peg having a slot therein. Then, in a step 1204, a combustion liner is provided, where the combustion liner has a plurality of mounting tabs extending away from an outer surface of the combustion liner. In a step 1206, the combustion liner is inserted into the flow sleeve such that the plurality of mounting tabs is located within the slots of the plurality of flow sleeve pegs. A liner stop bracket is placed onto a flange of the flow sleeve in a step 1208 such that a bottom contact surface of the liner stop bracket is immediately adjacent a top contact surface of the mounting tab. Then, in a step 1210, the liner stop bracket is secured to the flow sleeve, where a plurality of removable fasteners can be used to secure the liner stop bracket to the flow sleeve. Once a combustion liner is secured into the flow sleeve, a combustor cap can then be installed over the combustion liner and flow sleeve, where a portion of the cap may extend within a bracket slot in the liner stop bracket.

The present disclosure serves to prevent undesired movement of a combustion liner relative to the flow sleeve. Furthermore, with a reduced profile mounting configuration extending in the air passage between the flow sleeve and combustion liner, blockage in the air passage is reduced.

Although a preferred embodiment of this disclosure has been disclosed, one of ordinary skill in this art would recognize that certain modifications would come within the scope of this disclosure. For that reason, the following claims should be studied to determine the true scope and content of this disclosure. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this disclosure is one well adapted to attain all the ends and objects hereinabove set forth together with other advantages which are obvious, and which are inherent to the structure.

It will be understood that certain features and subcombinations are of utility and may be employed without reference to other features and subcombinations. This is contemplated by and is within the scope of the claims.

What is claimed is:

1. A mounting system for a gas turbine combustion system comprising:
    a plurality of mounting tabs secured to a combustion liner, the mounting tabs having a top contact surface with a first width and a bottom contact surface with a second width;
    a plurality of pegs secured to a flow sleeve, the plurality of pegs each having a slot configured to receive one of the plurality of mounting tabs;
    a plurality of liner stop brackets secured to a flange of the flow sleeve and having an arm in contact with the top contact surface of the mounting tabs, at least one of the plurality of liner stop brackets comprising a bracket slot extending along a portion of the at least one of the plurality of liner stop brackets; and,
    a combustor cap which resides at least partially within the bracket slot.

2. The mounting system of claim 1, wherein the plurality of mounting tabs is equally spaced about the combustion liner.

3. The mounting system of claim 1, wherein the plurality of mounting tabs is positioned proximate an inlet end of the combustion liner.

4. The mounting system of claim 1, wherein the first width is greater than the second width.

5. The mounting system of claim 1 further comprising a recessed portion in the flange for receiving a first portion of the liner stop bracket.

6. The mounting system of claim 5, wherein the liner stop brackets are bolted to the flange of the flow sleeve.

7. The mounting system of claim 1 further comprising a bracket slot in the arm of the liner stop brackets.

8. A method of securing a combustion liner in a flow sleeve of a gas turbine combustor comprising:
    providing a flow sleeve having a plurality of flow sleeve pegs, with each flow sleeve peg having a slot;
    providing a combustion liner having a plurality of mounting tabs extending away from an outer surface of the combustion liner;
    inserting the combustion liner into the flow sleeve such that the plurality of mounting tabs is located within the slots of the plurality of flow sleeve pegs;
    placing a liner stop bracket onto a flange of the flow sleeve such that the liner stop bracket holds the mounting tab, the liner stop bracket comprising a bracket slot extending along a portion of the liner stop bracket;
    placing a portion of a combustor cap within the bracket slot; and,
    securing the liner stop bracket to the flange of the flow sleeve.

9. The method of claim 8, wherein the plurality of mounting tabs is positioned proximate an inlet end of the combustion liner.

10. The method of claim 8, wherein the flange of the flow sleeve further comprises a plurality of holes.

11. The method of claim 10 further comprising a plurality of fasteners placed through the liner stop bracket and the flow sleeve for securing the liner stop bracket to the flange of the flow sleeve.

12. A mounting system for a gas turbine combustion system comprising:
    a plurality of mounting tabs secured to a combustion liner, the mounting tabs having a top contact surface with a first width and a bottom contact surface with a second width that is less than the first width;
    a plurality of pegs secured to a flow sleeve, the plurality of pegs each having a slot configured to receive one of the plurality of mounting tabs; and,
    a plurality of liner stop brackets secured to a flange of the flow sleeve and having an arm in contact with the top contact surface of the mounting tabs, at least one of the plurality of liner stop brackets comprising a bracket slot extending along a portion of the at least one of the plurality of liner stop brackets; and,
    a combustor cap which resides at least partially within the bracket slot.

13. The mounting system of claim 12, wherein each of the plurality of liner stop brackets is removably secured to a recessed portion of the flange of the flow sleeve.

14. The mounting system of claim 13, wherein each of the plurality of liner stop brackets is bolted to the recessed portion of the flange of the flow sleeve.

15. The mounting system of claim 14, wherein each of the plurality of mounting tabs is positioned proximate an inlet end of the combustion liner.

\* \* \* \* \*